(12) United States Patent
Yasutomi (10) Patent No.: US 12,292,610 B2
(45) Date of Patent: May 6, 2025

(54) OPTICAL FIBER CABLE

(71) Applicant: FURUKAWA ELECTRIC CO., LTD., Tokyo (JP)

(72) Inventor: Tetsuya Yasutomi, Tokyo (JP)

(73) Assignee: FURUKAWA ELECTRIC CO., LTD., Tokyo (JP)

(*) Notice: Subject to any disclaimer, the term of this patent is extended or adjusted under 35 U.S.C. 154(b) by 202 days.

(21) Appl. No.: 17/878,971

(22) Filed: Aug. 2, 2022

(65) Prior Publication Data

US 2022/0373753 A1 Nov. 24, 2022

Related U.S. Application Data

(63) Continuation of application No. PCT/JP2021/008929, filed on Mar. 8, 2021.

(30) Foreign Application Priority Data

Mar. 27, 2020 (JP) ................................. 2020-057479

(51) Int. Cl.
*G02B 6/44* (2006.01)
*H01B 11/02* (2006.01)

(52) U.S. Cl.
CPC ......... *G02B 6/4403* (2013.01); *G02B 6/4413* (2013.01); *G02B 6/443* (2013.01); *H01B 11/02* (2013.01)

(58) Field of Classification Search
CPC .... G02B 6/4403; G02B 6/443; G02B 6/4433; G02B 6/4413; H01B 11/02; H01B 11/22
See application file for complete search history.

(56) References Cited

U.S. PATENT DOCUMENTS

| 4,147,406 | A |   | 4/1979 | Anderson |            |
|-----------|---|---|--------|----------|------------|
| 5,531,064 | A | * | 7/1996 | Sawano   | G02B 6/4411 |
|           |   |   |        |          | 385/112    |
| 6,292,611 | B1| * | 9/2001 | Chamberlain | G02B 6/4411 |
|           |   |   |        |          | 385/112    |

(Continued)

FOREIGN PATENT DOCUMENTS

| CA | 3063028 A1 |   | 12/2019 |             |
|----|------------|---|---------|-------------|
| CA | 3222457 A1 | * | 12/2022 | G02B 6/4403 |

(Continued)

OTHER PUBLICATIONS

International Preliminary Report on Patentability issued in International Patent Application No. PCT/JP2021/008929, dated Sep. 22, 2022.

(Continued)

*Primary Examiner* — Leslie C Pascal
(74) *Attorney, Agent, or Firm* — MARSHALL, GERSTEIN & BORUN LLP (57) ABSTRACT

This optical fiber cable is a central-core-type cable in which slotted rods are not used, and is composed of a core, a wrapper, a tension member, a ripcord, a sheath, and the like. The core is formed by twisting together a plurality of optical fiber units without back-twisting. The optical fiber units are formed by twisting together a plurality of intermittently-fixed optical fiber ribbons. A direction in which the optical fiber ribbons are twisted together is same as a direction in which the optical fiber units are twisted together.

3 Claims, 5 Drawing Sheets

(56) References Cited

U.S. PATENT DOCUMENTS

| | | |
|---|---|---|
| 9,734,940 B1 | 8/2017 | McNutt et al. |
| 2017/0146759 A1 | 5/2017 | Guenter et al. |
| 2020/0142144 A1* | 5/2020 | Blazer .................. G02B 6/567 |

FOREIGN PATENT DOCUMENTS

| | | | | |
|---|---|---|---|---|
| CN | 109147995 A | | 1/2019 | |
| CN | 210465782 U | * | 5/2020 | |
| CN | 111033342 B | | 6/2022 | |
| CN | 221326817 U | * | 7/2024 | |
| EP | 3796060 A1 | | 3/2021 | |
| JP | 2007233252 A | | 9/2007 | |
| JP | 2014106380 A | | 6/2014 | |
| JP | 2016-206353 A | | 12/2016 | |
| JP | 2018-17774 A | | 2/2018 | |
| JP | 2019109400 A | | 7/2019 | |
| TW | I529439 B | | 4/2016 | |
| WO | WO-2019088255 A1 | * | 5/2019 | ............... G02B 6/44 |

OTHER PUBLICATIONS

Examination Report issued in Indian Patent Application No. 202247053647, dated Jan. 31, 2023.

Office Action issued in Japanese Patent Application No. 2020-057479 dated Sep. 25, 2023.

International Search Report issued in PCT Pat. Appl. No. PCT/JP2021/008929 mailed on May 18, 2021.

Office Action issued in Taiwan Patent Application No. 110110382 dated May 19, 2022.

Extended European Search Report, related EP Application No. 21776514.8, mailing date Mar. 28, 2024.

* cited by examiner

OPTICAL FIBER CABLE

TECHNICAL FIELD

The present invention relates to an optical fiber cable that is formed by assembling and twisting together a plurality of optical fiber ribbons.

BACKGROUND

To increase an amount of information transmitted per optical fiber cable, an optical fiber cable has been densely accommodating a large number of optical fiber ribbons to include more cores, for example. However, increasing the number of cores accommodated in an optical fiber cable makes it difficult to specify an optical fiber. Thus, a method in which a plurality of optical fiber ribbons are bundled together to facilitate identification has been used. Such the plurality of optical fiber ribbons bundled together is referred to as an optical fiber unit. When in use, the required optical fiber ribbons are taken out and branched from the optical fiber unit.

Japanese Unexamined Patent Application Publication No. 2019-109400 (JP-A-2019-109400) discloses an optical fiber cable in which a plurality of optical fibers are twisted together to form an optical fiber unit, where a twisting direction of the plurality of optical fibers and a twisting direction of the plurality of optical fiber units are different from each other.

The object of Japanese Unexamined Patent Application Publication No. 2019-109400 (JP-A-2019-109400) is to prevent untwisting of the optical fibers at the time of being applied with tensile force by making the twisting direction of the optical fiber units different from the twisting direction of the optical fibers forming the optical fiber units.

However, since the twisting direction of the optical fiber units and the twisting direction of the optical fibers forming the optical fiber units are in the reverse directions, the optical fiber units are twisted in a direction in which the twisting of the optical fibers inside is to be unwound. This causes a twisting pitch of the optical fiber in the optical fiber cable to have a longer cycle than an intended pitch. This may increase distortion of the optical fiber and cause local bends and an increase in loss, when the manufactured optical fiber cable is wound around a drum for transport or bent along a laying route. Also, if the optical fiber is an intermittently-fixed optical fiber ribbon, joint portions of the intermittently-fixed optical fiber ribbon may break and the optical fibers may be separated from each other.

SUMMARY OF THE DISCLOSURE

The present invention was made in view of the above problems. It is an object of the present invention to provide an optical fiber cable in which an increase in loss and separation between joint portions of intermittently-fixed optical fiber ribbons are prevented.

To achieve the above object, the present invention is an optical fiber cable including a core and a sheath that is provided on an outer periphery of the core. The core is formed by twisting together a plurality of optical fiber units without back-twisting. The optical fiber units are formed by twisting together a plurality of intermittently-fixed optical fiber ribbons. A direction in which the optical fiber ribbons are twisted together is same as a direction in which the optical fiber units are twisted together.

Preferably, a twisting pitch of the plurality of optical fiber ribbons is no more than a twisting pitch of the optical fiber units.

The plurality of optical fiber ribbons may be twisted together with back-twisting.

According to the present invention, the direction in which the optical fiber ribbons are twisted together is the same as the direction in which the optical fiber units are twisted together. This can prevent twisting of the optical fiber ribbons from unwinding, and thus can prevent the twisting pitch of the optical fiber ribbons from having a large cycle inside the optical fiber unit at the time of twisting together the optical fiber units. Also, since the plurality of optical fiber units are twisted together without back-twisting, a device for back-twisting is unnecessary at the time of twisting together the optical fiber units, and untwisting of the optical fiber ribbons can be prevented.

Also, the twisting pitch of the optical fiber ribbons is no more than the twisting pitch of the optical fiber units, and thus twisting of the optical fiber ribbons inside the optical fiber unit is sufficient, which can prevent an increase in loss.

Also, if the plurality of optical fiber ribbons are twisted together with back-twisting, untwisting of the optical fiber ribbons can be further prevented.

The present invention can provide an optical fiber cable in which an increase in loss and separation between joint portions of an intermittently-fixed optical fiber ribbon can be prevented.

DETAILED DESCRIPTION

Figure 1:
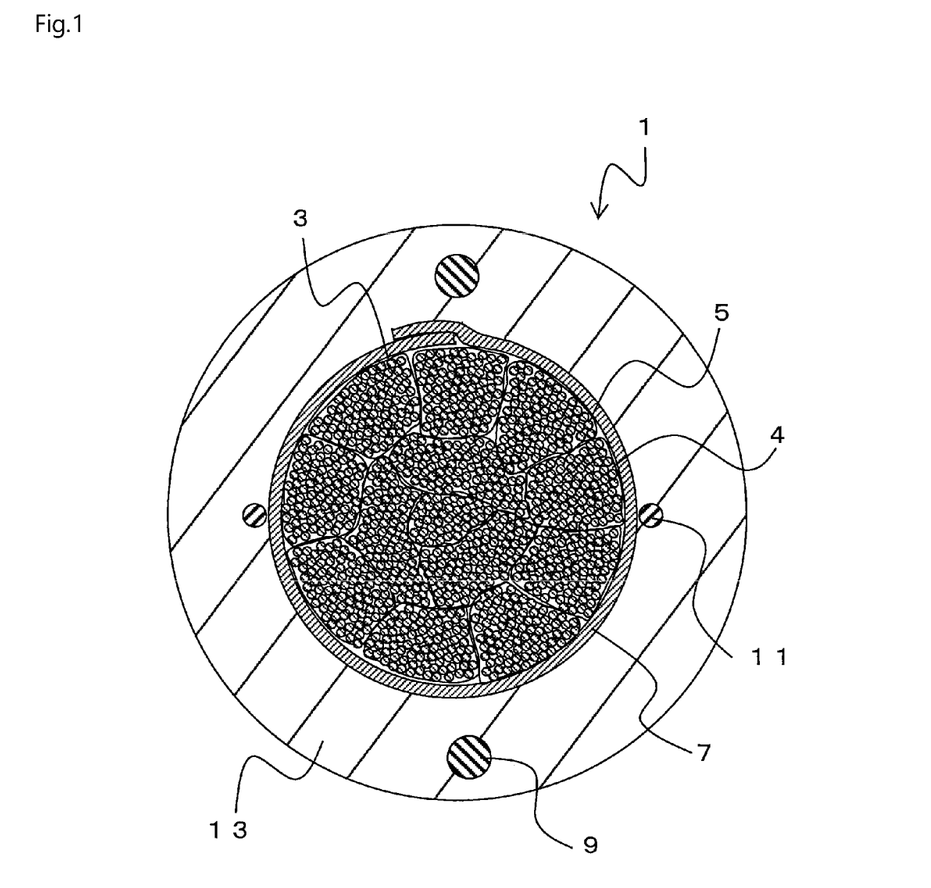
FIG. 1 is a cross-sectional view showing an optical fiber cable 1.

Hereinafter, an embodiment of the present invention will be described with reference to the accompanying drawings. FIG. 1 is a cross-sectional view showing an optical fiber cable 1. The optical fiber cable 1 is a central-core-type cable in which slotted rods are not used. The optical fiber cable 1 includes a core 4, a wrapper 7, a tension member 9, a ripcord 11, a sheath 13, and so on.

The core 4 is formed by twisting together a plurality of optical fiber units 5 without back-twisting. The back-twisting will be described below. Also, the optical fiber unit 5 is formed by twisting together a plurality of intermittently-fixed optical fiber ribbons 3.

Figure 2:
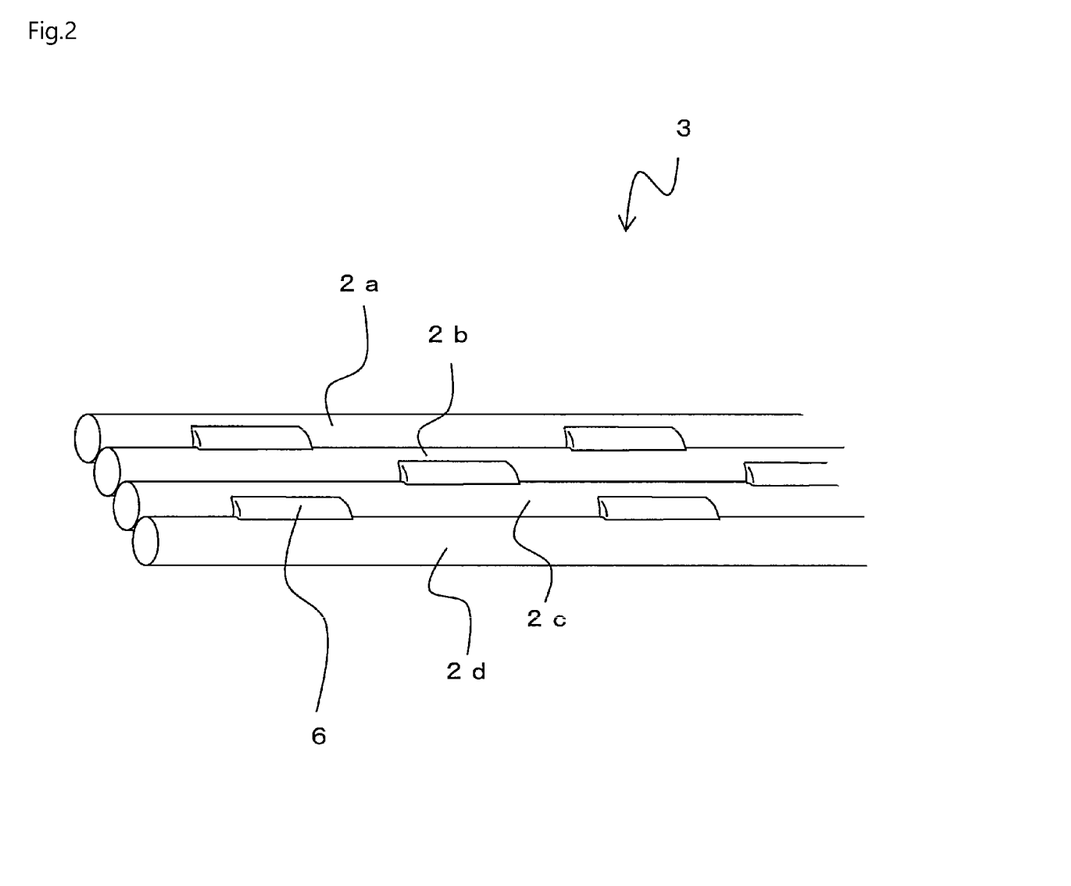
FIG. 2 is a view showing an optical fiber ribbon 3.

FIG. 2 is a perspective view showing the intermittently-fixed optical fiber ribbon 3. The optical fiber ribbon 3 is formed by disposing side by side and bonding with each other a plurality of optical fibers 2a, 2b, 2c, and 2d. The number of optical fibers forming the optical fiber ribbon 3 is not limited to the one shown in the illustrated example.

In the present embodiment, as shown in FIG. 2, the adjacent optical fibers 2a, 2b, 2c, and 2d are intermittently bonded with each other at bonding portions 6 at predetermined intervals in a longitudinal direction of the optical fiber ribbon 3. In addition, the bonding portions 6, which are adjacent to each other in a width direction, are preferably disposed being shifted from each other in the longitudinal direction of the optical fiber ribbon 3. For example, the adjacent bonding portions 6 are preferably formed being shifted for half a pitch in the longitudinal direction of the optical fiber ribbon 3. Here, the length and the pitch of the bonding portions 6 are not limited to those shown in the illustrated example.

As above, with the bonding portions 6 being arranged intermittently in the longitudinal direction of the optical fiber ribbon 3, the adjacent optical fibers 2a, 2b, 2c, and 2d can be easily folded (bent) at non-bonded portions along a side-by-side direction of the optical fibers 2a, 2b, 2c, and 2d.

As shown in FIG. 1, the wrapper 7 is provided on an outer periphery of the plurality of optical fiber units 5. The wrapper 7 is a tape-shaped member or a non-woven cloth, which is disposed so as to wrap the plurality of the optical fiber units 5 lengthwise, collectively covering the outer periphery of the plurality of optical fiber units 5. That is, a longitudinal direction of the wrapper 7 approximately corresponds with an axial direction of the optical fiber cable 1, and the wrapper 7 is wrapped around the outer periphery of the plurality of optical fiber units 5 lengthwise so that a width direction of the wrapper 7 corresponds with a circumference direction of the optical fiber cable 1. The wrapper 7 is not always necessary, and the core 4 may be sometimes referred to as to include the wrapper 7.

The sheath 13 is provided on an outer periphery of the cable core 4. The sheath 13 is a layer for covering and protecting the optical fiber cable 1. A pair of the tension members 9 are provided inside the sheath 13 at positions that are facing each other with the core 4 in the middle on a cross section taken perpendicularly to the longitudinal direction of the optical fiber cable 1. Also, the ripcords 11 are provided in a direction substantially perpendicular to a facing direction in which the tension members 9 face each other with the core 4 in the middle. The tension members 9 and the ripcords 11 are embedded in the sheath 13.

Figure 3:
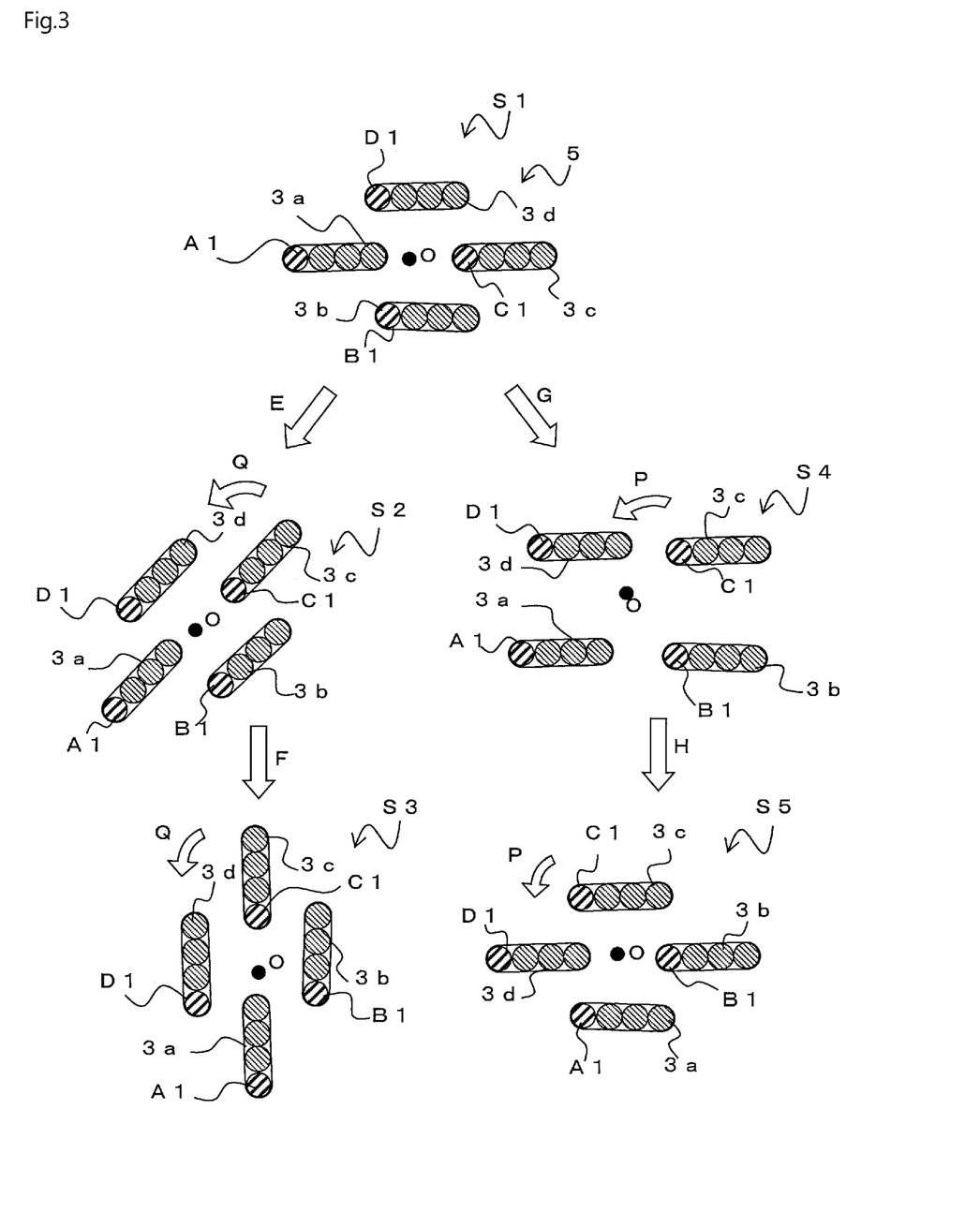
FIG. 3 is a view showing steps of twisting the optical fiber ribbons 3 together.

Next, twisting together of the optical fiber ribbons 3 will be described. FIG. 3 is a cross-sectional schematic view showing directions of the optical fiber ribbons 3 at the time of twisting together the optical fiber ribbons 3 forming the optical fiber unit 5. In the descriptions hereafter, for simplification, an example in which the optical fiber unit 5 includes four optical fiber ribbons 3a, 3b, 3c, and 3d will be illustrated (the optical fiber ribbons 3a, 3b, 3c, and 3d may be collectively referred to as the optical fiber ribbons 3).

The top tier in FIG. 3 is a state (hereafter, referred to as a state S1) in which the optical fiber ribbons 3a, 3b, 3c, and 3d are disposed in a predetermined direction around a center of twist O of the optical fiber ribbons 3. Also, the optical fibers on one end of the optical fiber ribbons 3a, 3b, 3c, and 3d are referred to as A1, B1, C1, and D1, respectively.

In the state S1 of the illustrated example, all the optical fiber ribbons 3a, 3b, 3c, and 3d are disposed parallel to each other, facing toward the same direction. However, such the arrangement is not always necessary. For example, the optical fiber ribbons may be disposed in directions different from each other.

Also, although all the optical fiber ribbons 3a, 3b, 3c, and 3d include the optical fibers that are aligned on a straight line, this it not always necessary. For example, each of the optical fiber ribbons 3a, 3b, 3c, and 3d may be bent. In such the case, as mentioned above, the optical fiber ribbons 3a, 3b, 3c, and 3d formed by intermittently bonding the adjacent optical fibers with each other can be freely bent.

For example, at parts where an overall width is large, such as at the optical fiber ribbons 3a and 3c in the state S1 shown in FIG. 3, the optical fiber ribbons 3a and 3c can get closer to the center of twist O by being folded so as to be disposed stably. However, folding of the optical fiber ribbon 3 will not be reflected in the drawings hereafter for simplification, and the optical fiber ribbons 3 will be shown as being disposed on a straight line.

FIG. 3 shows two ways for twisting together the optical fiber ribbons 3 from the state S1. One includes steps of a state S2 (an arrow E on the left side in the drawing) and a state S3 (an arrow F). The other includes steps of a state S4 (an arrow G on the right side in the drawing) and a state S5 (an arrow H). The former illustrates twisting without back-twisting, and the latter illustrates twisting with back-twisting.

First, a case in which the optical fiber ribbons 3 are twisted together without back-twisting will be described in detail. The state S2 (the arrow E) shows a state in which the optical fiber ribbons 3 are twisted together by 45° with respect to the center of twist O from the state S1, and the state S3 (the arrow F) shows a state in which the optical fiber ribbons 3 are further twisted together by 45° with respect to the center of twist O from the state S2.

In the state S2, an arrangement of each of the optical fiber ribbons 3 is shifted by 45° in a circumferential direction with respect to the center of twist O (an arrow Q in the drawing), changing a direction of each of the optical fiber ribbons 3. That is, the direction of each of the optical fiber ribbons 3 is also rotated by 45° along with the arrangement shifting. For example, directions of A1, B1, C1, and D1 of the optical fiber ribbons 3a, 3b, 3c, and 3d, respectively, are rotated by 45° from the state S1 to the sate S2.

Similarly in the state S3, the arrangement of each of the optical fiber ribbons 3 is shifted further by 45° in the circumferential direction with respect to the center of twist O (an arrow Q in the drawing) from the state S2, changing the direction of each of the optical fiber ribbons 3 similarly. That is, the optical fiber ribbons 3 are twisted together by an angle of 90° from the state S1 to the state S3, rotating the whole optical fiber ribbons 3 with respect to the center of twist O.

Next, a case in which the optical fiber ribbons 3 are twisted together with back-twisting will be described in detail. The state S4 (the arrow G) shows a state in which the optical fiber ribbons 3 are twisted together by 45° with respect to the center of twist O from the state S1, and the state S5 (the arrow H) shows a state in which the optical fiber ribbons 3 are further twisted together by 45° with respect to the center of twist O from the state S4.

In the state S4, the arrangement of each of the optical fiber ribbons 3 is shifted by 45° in the circumferential direction with respect to the center of twist O (an arrow P in the drawing). At this time, the direction of each of the optical fiber ribbons 3 does not change. That is, all the optical fiber ribbons 3 face approximately the same direction, and only the arrangement in the circumferential direction with respect to the center of twist O changes. For example, the directions of A1, B1, C1, and D1 of the optical fiber ribbons 3a, 3b, 3c, and 3d, respectively, do not change from the state S1 to the state S4 (all the directions are toward the left side in the drawing).

Similarly in the state S5, the arrangement of each of the optical fiber ribbons 3 is shifted by 45° in the circumferential direction with respect to the center of twist O (an arrow P in the drawing) from the state S4. However, the direction of each of the optical fiber ribbons 3 does not change. That is, although the optical fiber ribbons 3 are twisted together by an angle of 90° in the steps of the states S1, S4, and S5, the optical fiber ribbons 3 still face approximately the same direction, and only the arrangement in the circumferential direction with respect to the center of twist O changes.

Figure 4:
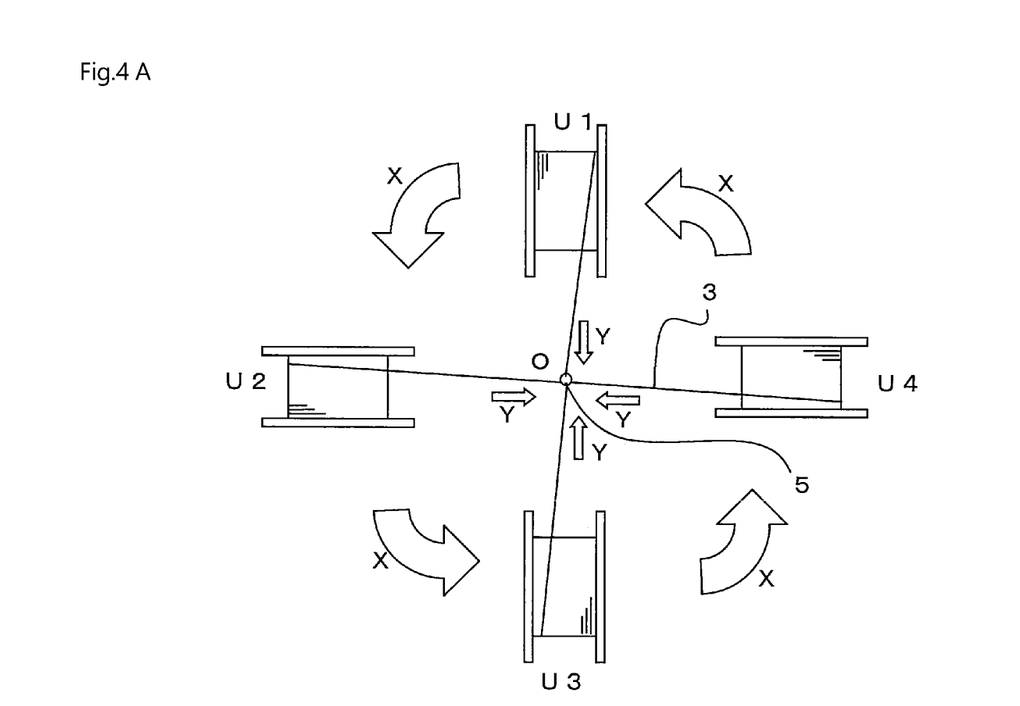
FIG. 4A is a view showing a method for twisting optical fiber units together without back-twisting.
FIG. 4B is a view showing a method for twisting the optical fiber units together with back-twisting.

Next, a method for manufacturing the optical fiber unit 5 with back-twisting and a method for manufacturing the optical fiber unit 5 without back-twisting will be described, respectively. FIG. 4A is a view showing a method for twisting together the optical fiber ribbons 3 without back-twisting. The center of twist O is at the center in the drawing, and the twisted optical fiber unit 5 flows in a direction vertical to the paper surface. Illustrations of bundle materials or the like are omitted.

A plurality of bobbins 15, to each of which the optical fiber ribbon 3 is wound up, are disposed at predetermined intervals in a circumferential direction with respect to the center of twist O of the optical fiber ribbons (U1, U2, U3, and U4 in the drawing). Each of the bobbins 15 provides the optical fiber ribbon 3 to the center of twist O (Y in the drawing), and each of the bobbins 15 moves around the center of twist O (X in the drawing). For example, one of the bobbins 15 at a position of U1 moves to the positions U2, U3, and U4 in sequence. Thus, the optical fiber ribbons 3 that are provided by the bobbins 15 are twisted together.

In such the method, directions of the bobbins 15 change depending on positions thereof with respect to the center of twist O. More specifically, each of the bobbins 15 moves around the center of twist O while rotating such that the bobbins 15 always face the center of twist O. When being viewed from the other way, from the center O, each of the bobbins 15 moves around the center of twist O without being rotated at each position such that the directions of the bobbins 15 are always the same. Thus, the optical fiber ribbons 3 are twisted together without back-twisting.

FIG. 4B, on the other hand, is a view showing a method for twisting together the optical fiber ribbons 3 with back-twisting.

Similarly to FIG. 4A, the plurality of bobbins 15, to each of which the optical fiber ribbon 3 is wound up, are disposed at predetermined intervals in a circumferential direction with respect to the center of twist O of the optical fiber ribbons (T1, T2, T3, and T4 in the drawing). Each of the bobbins 15 provides the optical fiber ribbon 3 to the center of twist O (W in the drawing), and each of the bobbins 15 moves around the center of twist O (V in the drawing). For example, one of the bobbins 15 at a position of T1 moves to the positions T2, T3, and T4 in sequence.

In the present method, each of the bobbins 15 moves around the center of twist O facing approximately the same direction at any positions with respect to the center of twist O. That is, the bobbins 15 are moved on an outer periphery of the center of twist O in the circumferential direction without changing the directions of the bobbins 15. When being viewed from the other way, from the center O, each of the bobbins 15 revolves around the center O (revolution) while rotating in a direction opposite to the revolution direction (rotation). In this way, the optical fiber ribbons 3 can be twisted together with back-twisting.

Twisting together the optical fiber ribbons 3 with back-twisting can prevent untwisting of the optical fiber ribbons 3. That is, when the optical fiber ribbons 3 are twisted together with back-twisting to form the optical fiber unit 5, twisting of the optical fiber ribbons 3 are unlikely to be untwisted and thus handling is easy. Also, if the optical fiber ribbons 3 are twisted together without back-twisting, there is a possibility that, when the twisted optical fiber unit 5 is wound around a sheave of a pulling device or the like, a width direction of the optical fiber ribbon 3 comes in direct contact with a surface of the sheave vertically. In such the case, if the optical fiber ribbon 3 is an intermittently-fixed optical fiber ribbon, the bonding portions 6 may be separated. For this reason, it is preferable that the plurality of optical fiber ribbons 3 are twisted together with back-twisting.

To twist together with back-twisting as above, it is required for a device for twisting together without back-twisting to control the rotation, in addition to the revolution. That is, a special device is required. Thus, unless a problem of untwisting of the optical fiber ribbons 3 occurs, back-twisting is not always necessary. When twisting together the optical fiber ribbons 3 without back-twisting, the above-mentioned special device for providing back-twisting is unnecessary, and thus manufacturing cost can be reduced.

Next, a method for twisting together the optical fiber units 5 manufactured as above will be described. In the present invention, a twisting direction of the optical fiber ribbons 3 and a twisting direction of the optical fiber units 5 are the same. If the twisting direction of the optical fiber ribbons 3 is opposite to the twisting direction of the optical fiber units 5, a twisting pitch of the optical fiber ribbons 3 inside may become large when the optical fiber units 5 are twisted together. This may increase distortion given to the optical fiber ribbons 3 when the optical fiber cable 1 is bent at the time of transport or handling, which may increase the loss or cause separation of the bonding portions 6 of the optical fiber ribbons 3.

Figure 5:
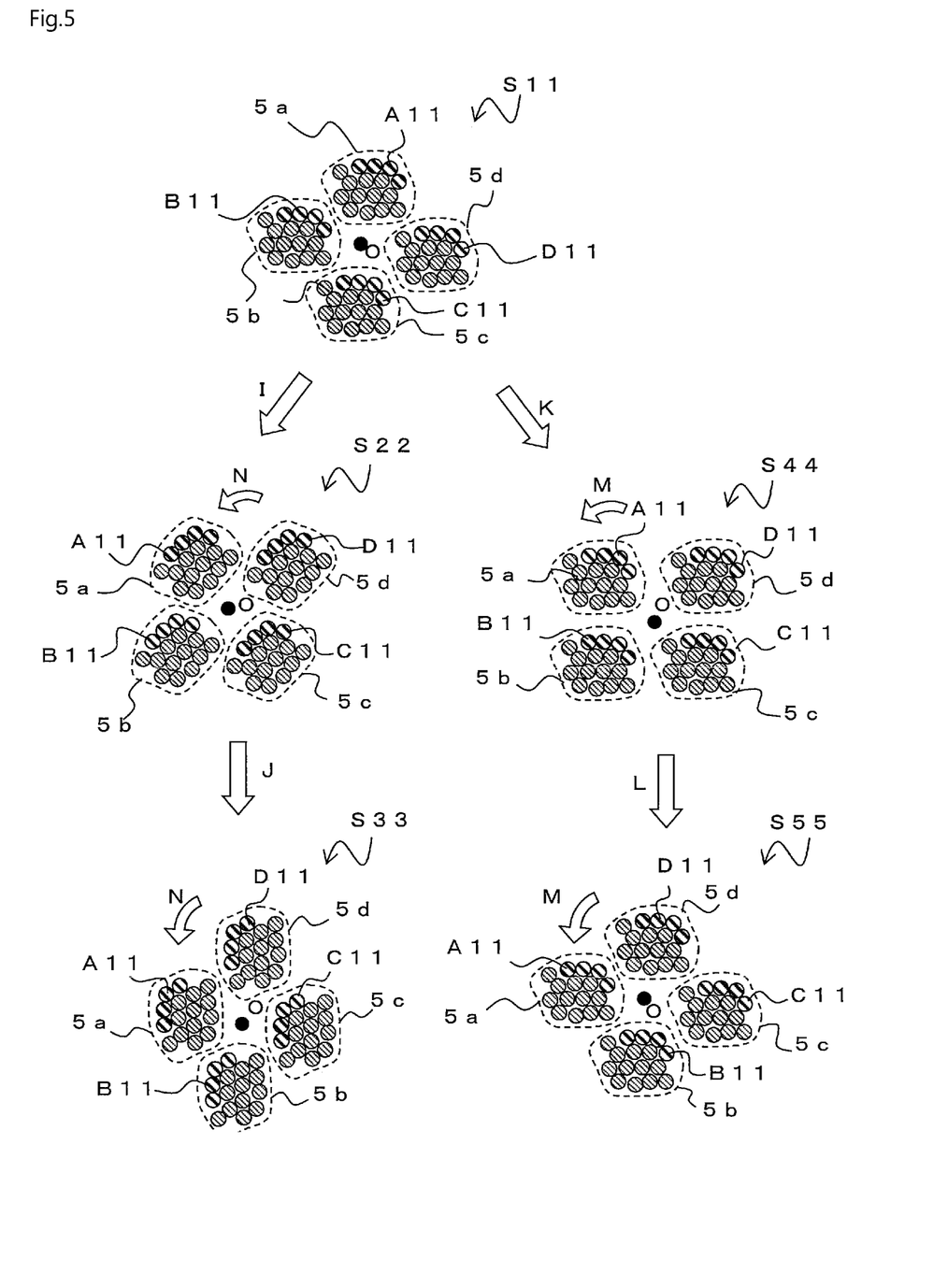
FIG. 5 is a view showing steps of twisting optical fiber units 5 together.

FIG. 5 is a cross-sectional schematic view, like FIG. 3, showing directions of the optical fiber units 5 when the optical fiber units 5 are twisted together. In the descriptions hereafter, an example in which four optical fiber units 5a, 5b, 5c, and 5d are twisted together will be illustrated for simplification (the optical fiber ribbons 5a, 5b, 5c, and 5d may be collectively referred to as the optical fiber ribbons 5).

The top tier in FIG. 5 is a state (hereafter, referred to as a state S11) in which the optical fiber units 5a, 5b, 5c, and 5d are disposed in a predetermined direction around the center of twist O of the optical fiber units 5. Also, the optical fiber ribbons on one end of the optical fiber units 5a, 5b, 5c, and 5d are referred to as A11, B11, C11, and D11, respectively.

First, a case in which the optical fiber units 5 are twisted together without back-twisting will be described in detail. A state S22 (an arrow I) shows a state in which the optical fiber units 5 are twisted by 45° with respect to the center of twist O from the state S11, and a state S33 (an arrow J) shows a state in which the optical fiber units 5 are twisted further by 45° with respect to the center of twist O from the state S22.

In the states S22 and S33, an arrangement of each of the optical fiber units 5 is shifted by 45° in a circumferential direction with respect to the center of twist O (an arrow N in the drawing), changing a direction of each of the optical fiber units 5. That is, the direction of each of the optical fiber units 5 is also rotated by 45° along with the arrangement shifting. For example, directions of A11, B11, C11, and D11 of the optical fiber units 5a, 5b, 5c, and 5d, respectively, are rotated 45° in each step from the state S11 to the state S33. That is, the optical fiber units 5 are twisted together from the state S11 to the state S33 by an angle of 90°, rotating the whole optical fiber units 5 with respect to the center of twist O.

Next, a case in which the optical fiber units 5 are twisted together with back-twisting will be described in detail. A state S44 (an arrow K) shows a state in which the optical fiber units 5 are twisted by 45° with respect to the center of twist O from the state S11, and a state S55 (an arrow L) shows a state in which the optical fiber units 5 are twisted further by 45° with respect to the center of twist O from the state S44.

In the states S44 and S55, the arrangement of each of the optical fiber units 5 is shifted by 45° in the circumferential direction with respect to the center of twist O (an arrow M in the drawing). At this time, the direction of each of the optical fiber units 5 does not change. That is, all the optical fiber units 5 face approximately the same direction, and only the arrangement in the circumferential direction with respect to the center of twist O changes. For example, the directions of A11, B11, C11, and D11 of the optical fiber units 5a, 5b, 5c, and 5d, respectively, do not change in the states S11, S44, and S55. That is, although the optical fiber units 5 are twisted together by an angle of 90° from the state S11 through S44 to S55, the optical fiber units 5 still face approximately the same direction, and only the arrangement in the circumferential direction with respect to the center of twist O changes.

Similarly to the case of the optical fiber ribbons 3, twisting together the optical fiber units 5 with back-twisting can reduce untwisting of the optical fiber units 5 after being twisted together. Nevertheless, in the present invention, it is preferable to twist together the optical fiber units 5 without back-twisting. The reasons for this are as follows.

As mentioned above, a special device is required for twisting with back-twisting. Also, it is likely that the number of optical fiber units 5 to be twisted together is large, and thus the device for twisting together with back-twisting may become large in size, which may increase the manufacturing cost.

Also, as mentioned above, when the optical fiber units 5 are twisted together with back-twisting, the optical fiber units 5 are twisted together while being twisted (rotation) in a direction opposite to a twisting (revolution) direction. For this reason, when the optical fiber units 5 are twisted together with back-twisting such that the twisting directions of the optical fiber units 5 and the optical fiber ribbons 3 are the same, the optical fiber units 5 are twisted in a direction unwinding the twisting of the optical fiber ribbons 3 inside, which reduces effects of twisting of the optical fiber ribbons 3. Thus, when twisting together the optical fiber units 5 and the optical fiber ribbons 3 in the same twisting directions as in the present embodiment, it is more preferable to twist the optical fiber units 5 without back-twisting.

Also, when twisting optical fiber units 5 in which intermittently-fixed optical fiber ribbons are twisted, each of the twisted optical fiber units 5 has a large diameter and other optical fiber ribbons 3 inside the optical fiber unit 5 act as cushions. Thus, when the optical fiber unit 5 is wound around a sheave of a pulling device or the like, separation of the bonding portions 6 is less likely to occur. Thus, there is no need to twist together the optical fiber units 5 with back-twisting.

Also, a twisting pitch of the optical fiber ribbons 3 is preferably between 250 mm and 900 mm. If the twisting pitch of the optical fiber ribbons 3 is too small, twisting of the optical fiber ribbons 3 becomes tight and this may cause untwisting. If the twisting pitch of the optical fiber ribbons 3 is too large on the other hand, the twisting of the optical fiber ribbons 3 becomes loose and this may cause, as mentioned above, the increase in loss or separation of the bonding portions 6 of the optical fiber ribbons 3.

Also, it is preferable that the twisting pitch of the optical fiber units 5 is between 400 mm and 950 mm. If the twisting pitch of the optical fiber units 5 is too small, twisting of the optical fiber units 5 becomes tight and this may cause untwisting. If the twisting pitch of the optical fiber units 5 is too large on the other hand, the twisting of the optical fiber units 5 becomes loose and this may cause the increase in loss or the like.

Also, it is preferable that the twisting pitch of the plurality of optical fiber ribbons 3 is no more than the twisting pitch of the plurality of optical fiber units 5, and it is more preferable that the twisting pitch of the plurality of optical fiber ribbons 3 is smaller than the twisting pitch of the plurality of optical fiber units 5.

Here, as mentioned above, both the twisting pitch of the plurality of optical fiber ribbons 3 and the twisting pitch of the plurality of optical fiber units 5 are made as small as possible to an extent that the increase in loss does not occur due to a small bending radius at the time of twisting together. This can prevent the increase in transmission loss since distortion of the optical fiber cable 1 can be relaxed when being bent.

On the other hand, for the optical fiber ribbons 3 in which the twisting subject is thinner compared to the optical fiber units 5, the increase in loss due to twisting together with the smaller pitch is less likely to occur. Furthermore, by twisting together with back-twisting, the untwisting is less likely to occur even if the twisting pitch is smaller.

In contrast, untwisting of the optical fiber units 5 is less likely to occur even without back-twisting when the twisting pitch is larger. Also, if the optical fiber ribbons 3 are sufficiently twisted together, the increase in loss at the time of bending the optical fiber cable 1 and the separation of the bonding portions 6 of the optical fiber ribbons 3 are less likely to occur even with the larger twisting pitch of the optical fiber units 5. Thus, it is preferable to make the twisting pitch of the optical fiber ribbons 3 small and the twisting pitch of the optical fiber units 5 relatively long.

When the optical fiber ribbons 3 and the optical fiber units 5 are twisted together in the same directions, there is a concern that untwisting may occur when tension is applied. However, rigidity of the optical fiber ribbons 3 is not so high, and, in addition, even if there is some untwisting of the optical fiber units 5, the increase in loss can be prevented with sufficient twisting of the optical fiber ribbons 3. In particular, making the twisting pitch of the optical fiber units 5 relatively larger can reduce the effects of untwisting of the optical fiber units 5, and making the twisting pitch of the optical fiber ribbons 3 relatively smaller can reduce the effects of some untwisting, if any, of the optical fiber units 5. Furthermore, twisting together the optical fiber ribbons 3 with back-twisting can prevent untwisting of the optical fiber ribbons 3.

As described above, according to the present embodiment, the twisting direction of the optical fiber ribbons 3 and the twisting direction of the optical fiber units 5 are the same. Thus, it is possible to prevent the twisting pitch of the optical fiber ribbons 3 from having a large cycle when the twisting of the optical fiber ribbons 3 is unwound at the time of twisting together the optical fiber units 5. In particular, since the optical fiber units 5 are twisted together without back-twisting, the device for back-twisting is unnecessary at the time of twisting together the optical fiber units 5, and unwinding of the twisting of the optical fiber ribbons 3 at the time of twisting together the optical fiber units 5 can be prevented with certainty.

Also, since the twisting pitch of the optical fiber ribbons 3 is no more than the twisting pitch of the optical fiber units 5, the twisting of the optical fiber ribbons 3 inside the optical fiber unit 5 is sufficient, which can prevent the increase in loss.

Also, if the plurality of optical fiber ribbons 3 are twisted together with back-twisting, untwisting of the optical fiber ribbons 3 can be prevented with more certainty.

Working Examples

A plurality of optical fiber cables are produced to be evaluated on increase in loss and so on. The optical fiber cables are configured approximately similarly as shown in FIG. 1. First, eight optical fibers each having a diameter of 250 μm are intermittently fixed with each other to form an intermittently-fixed eight-core optical fiber ribbon. Ten of such the optical fiber ribbons are twisted together and a plastic tape having a width of 2 mm is wound around to form an eighty-core optical fiber unit, and five of such the optical fiber ribbons are twisted together and a plastic tape having a width of 2 mm is wound around to form a forty-core optical fiber unit.

Twelve of the eighty-core optical fiber units and one of the forty-core optical fiber unit are supplied and twisted together, to which a water-absorbing non-woven cloth is laterally applied and rolled with a forming tool, and a nylon-made presser string is wound around to create a 1000-core core.

The core created as above, a tension member using a steel wire having a 1.6 mm diameter, and a ripcord for ripping the outer sheath are covered and formed into a cylindrical shape by an outer sheath material to create an optical fiber cable. LLDPE is used as the outer sheath material.

The twisting direction and the twisting pitch of the optical fiber ribbons and the twisting direction and the twisting pitch of the optical fiber units are varied so as to create various samples to examine various properties. The results are shown in Table 1.

TABLE 1

| | Working Example 1 | Working Example 2 | Working Example 3 | Working Example 4 | Working Example 5 | Working Example 6 | Working Example 7 | Comparative Example 1 | Comparative Example 2 | Comparative Example 3 |
|---|---|---|---|---|---|---|---|---|---|---|
| Ribbon Twisting Direction | Left | Left | Left | Left | Left | Left | Right | Left | Left | Left |
| Ribbon Twisting Pitch (mm) | 750 | 500 | 300 | 500 | 300 | 300 | 300 | 750 | 200 | 300 |
| Ribbon Back-Twisting | No | No | No | Yes | Yes | Yes | Yes | No | Yes | Yes |
| Unit Twisting Direction | Left | Left | Left | Left | Left | Left | Right | Right | Left | Left |
| Unit Twisting Pitch (mm) | 750 | 750 | 750 | 750 | 750 | 400 | 750 | 750 | 750 | 350 |
| Unit Back-Twisting | No | No | No | No | No | No | No | Yes | No | No |
| Increase in Loss of 0.01 dB/km or more and less than 0.02 dB/km | Exist | Exist | Exist | Exist | None | None | None | Exist | None | None |
| Increase in Loss of 0.02 dB/km or more and less than 0.05 dB/km | Exist | Exist | None | None | None | None | None | Exist | None | None |
| Increase in Loss of 0.05 dB/km or more and less than 0.10 dB/km | Exist | None | None | None | None | None | None | Exist | None | None |
| Increase in Loss of 0.10 dB/km or more | None | None | None | None | None | None | None | Exist | None | None |
| Crack in Ribbon Joints | None | None | None | None | None | None | None | Exist | None | None |
| Untwisting of Ribbons in Unit | None | None | None | None | None | None | None | None | Exist | None |
| Untwisting of Units | None | None | None | None | None | None | None | None | None | Exist |

"Ribbon Twisting Direction", "Ribbon Twisting Pitch", and "Ribbon Back-Twisting" in Table 1 represent the twisting direction of the optical fiber ribbons, the twisting pitch of the optical fiber ribbons, and with or without back-twisting of the optical fiber ribbons, respectively. "Unit Twisting Direction", "Unit Twisting Pitch", and "Unit Back-Twisting" in Table 1 represent the twisting direction of the optical fiber units, the twisting pitch of the optical fiber units, and with or without back-twisting of the optical fiber units, respectively.

The increase in loss is measured by calculating a difference between measurements, taken at a wavelength of 1500 nm with an OTDR, before and after creating the optical fiber cables. The measurements are taken with the optical fiber cable being wound around a drum having a diameter of 1000 mm.

Also, "Crack in Ribbon Joints" is checked by unwinding the optical fiber cable from the above-mentioned drum, removing 2 meters of the outer sheath and the plastic tape at the end of the cable, and taking out and looking at the optical fiber ribbons inside. If there are any cracks in part of the bonding portions (separation of the optical fibers), the "crack in ribbon joints" is judged as "Exist".

Also, "Untwisting of Ribbons in Unit" is marked as "Exist" when 2 meters of the plastic tape at the end of the optical fiber unit is removed and the optical fiber ribbons rotate by 180° or more and is untwisted. Similarly, "Untwisting of Units" is marked as "Exist" when 2 meters of the plastic tape at the end of the optical fiber cable is removed and the optical fiber units rotate by 180° or more and is untwisted.

From the results, in any of the Working Examples 1 to 7 in which the twisting direction of the optical fiber ribbons and the twisting direction of the optical fiber units are the same, there is no "Crack in Ribbon Joints", no "Untwisting of Ribbons in Unit", no "Untwisting of Units", and no increase in loss of 0.10 dB/km or more. In particular, the increase in loss is further suppressed in the Working Examples 2 to 7, where the twisting pitch of the optical fiber ribbons is smaller than the twisting pitch of the optical fiber units. Also, it is clear from comparisons between the Working Example 2 and the Working Example 4, and between the Working Example 3 and the Working Example 5, that the increase in loss can be further reduced by twisting together the optical fiber ribbons with back-twisting.

On the other hand, in Comparative Example 1 where the twisting direction of the optical fiber ribbons and the twisting direction of the optical fiber units are different, the twisting of the optical fiber ribbons is unwound and cracks in bonding portions of the fiber ribbons are found. In Comparative Example 2, no cracks in bonding portions of the fiber ribbons are found since the twisting direction of the optical fiber ribbons and the twisting direction of the optical fiber units are the same. However, in Comparative Example 2, the twisting pitch of the optical fiber ribbons is too small and thus untwisting of the ribbons occurs. Also in Comparative Example 3, although no cracks in bonding portions of the fiber ribbons are found since the twisting direction of the optical fiber ribbons and the twisting direction of the optical fiber units are the same, untwisting of the units occurs because the twisting pitch of the optical fiber units is too small.

Although the embodiments of the present invention have been described referring to the attached drawings, the technical scope of the present invention is not limited to the embodiments described above. It is obvious that persons skilled in the art can think out various examples of changes or modifications within the scope of the technical idea disclosed in the claims, and it will be understood that they naturally belong to the technical scope of the present invention.

For example, a cross section of the central-core-type cable is not limited to the one shown in FIG. 1.

What is claimed is:

1. An optical fiber cable comprising:
   a core that is formed by twisting together a plurality of optical fiber units without back-twisting; and
   a sheath that is provided on an outer periphery of the core, wherein
   each of the plurality of optical fiber units is formed by twisting together a plurality of intermittently-fixed optical fiber ribbons; and
   a revolution direction in which the plurality of intermittently-fixed optical fiber ribbons are twisted together is the same as a revolution direction in which the plurality of optical fiber units are twisted together;
   wherein a twisting pitch of the plurality of intermittently-fixed optical fiber ribbons is no more than a twisting pitch of the plurality of optical fiber units.

2. The optical fiber cable according to claim 1, wherein the plurality of intermittently-fixed optical fiber ribbons are twisted together with back-twisting.

3. The optical fiber cable according to claim 1, wherein a twisting pitch of the plurality of intermittently-fixed optical fiber ribbons is 300 mm to 750 mm, and a twisting pitch of the plurality of optical fiber units is 400 mm to 750 mm.

* * * * *